Dec. 23, 1952      J. F. FINNEGAN      2,622,341
PNEUMATIC GRAIN CONVEYER AND DRIER
Filed Sept. 25, 1948
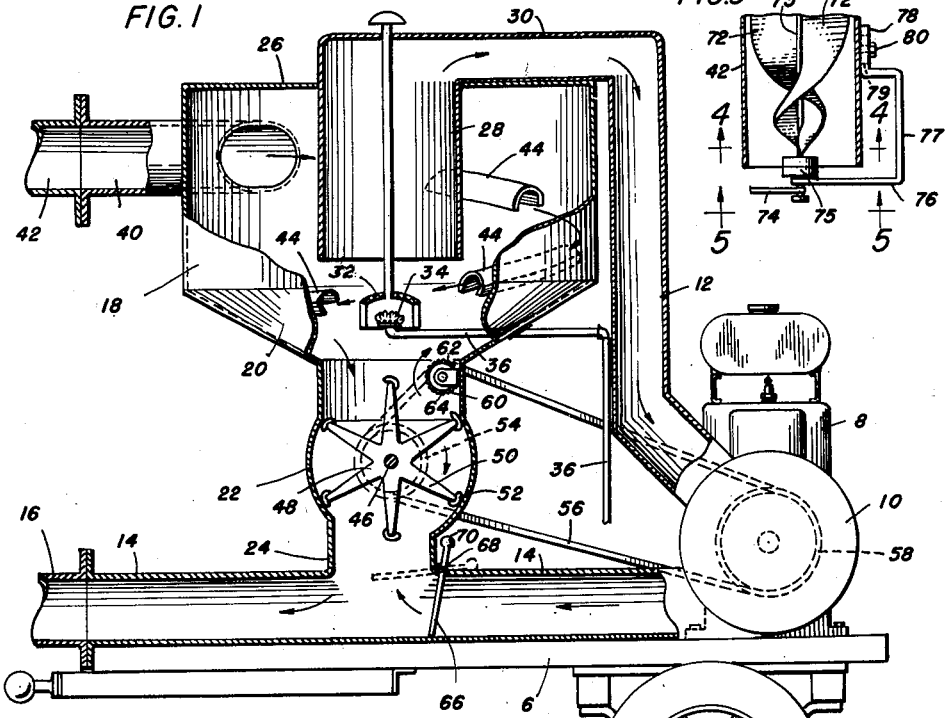
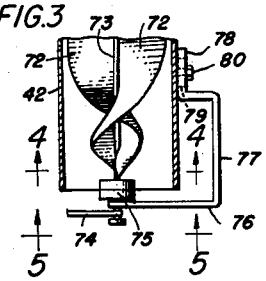
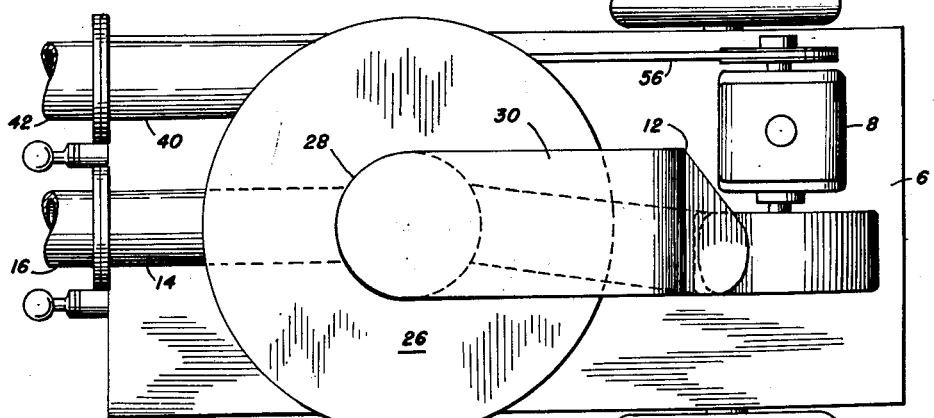
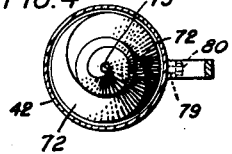
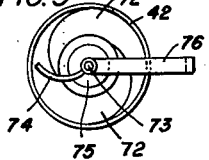
INVENTOR:
JAMES F. FINNEGAN
BY
ATT'Y Patented Dec. 23, 1952

2,622,341

UNITED STATES PATENT OFFICE 2,622,341

PNEUMATIC GRAIN CONVEYER AND DRIER

James F. Finnegan, La Salle, Ill.

Application September 25, 1948, Serial No. 51,285

4 Claims. (Cl. 34—57)

This invention relates to a pneumatic conveyor elevator or transfer device for moving hay, grain, or other loose materials by means of a blower of the fan type utilizing the suction of the fan to draw the material in and the blowing of the fan to discharge it.

In previous pneumatic elevators of this type, one of the main objections is that it is very difficult to feed chopped hay, grain, and loose materials of various kinds through a rotary bladed feeder without leaking air between the suction and exhaust sides, because the ends of the feed arms are likely to become clogged, and to damage or injure the material which it is intended to transport, thereby impairing the efficiency of the apparatus and damaging the grain or other material, causing a reduction in its market value.

In the present invention, the ends of the feeder arms are wiped clear of materials before the arms enter the sealing chamber so that the materials, if hay or grain, are not damaged in the feeder, and there is a minimum air leakage between the suction and discharge side of the feeder. At no time does the material pass through the air suction fan or blower or come into contact with its blades.

An important object of the invention is to provide a portable pneumatic conveyor which may be easily moved from one place to another for operation in picking up, conveying, elevating and transferring hay, grain, or the like, by means of a combined suction and blower type of apparatus.

A further object of the invention is to provide a suction blower elevator for hay, or the like, to prevent the material from clogging the feeder, preventing its rotation, and thereby damaging the material which is being transferred.

Still a further object of the invention is to provide a heater in a conveyor of this type by means of which moisture may be removed from the material in transit so that the hay or other material will not be delivered in a damp or wet condition, but will be partially dried as it passes through the apparatus; and to discharge heated air for space drying of material already transferred, such as hay in a mow or corn in a bin.

Another object of the invention is to provide means for controlling the air flow and therefore the discharge of material which passes through the conveyor.

Another object of the invention is to provide improved means for guiding the material which is drawn into the conveyor by suction and to provide an improved guide for removing air from the separator apparatus without withdrawing the material at the same time.

Another object of the invention is to provide means actuated by suction to loosen and stir up material at the inlet end of the suction pipe and to insure that the material is fed evenly and smoothly therein, preventing clogging and the formation of slugs of the material in the pipe.

Other objects of the invention will appear in the specification and will be apparent from the accompanying drawings in which, Fig. 1 is a sectional elevation of a conveyor in accordance with this invention mounted upon a transfer truck;

Fig. 2 is a top view of the apparatus shown in Fig. 1;

Fig. 3 is a sectional view of the inlet end of the suction or loading pipe;

Fig. 4 is a sectional view of the structure shown in Fig. 3, taken on the line 4—4 thereof; and Fig. 5 is an end view taken on the line 5—5 of Fig. 3.

Although this invention is described as a portable pneumatic conveyor for transferring grain, hay, or the like, it may also be in the form of a permanent or stationary installation for the same or similar materials. As a hay or grain conveyor, the apparatus may be moved from one place to the other for picking up and delivering hay, grain, or the like, to any one of several locations, for elevating the material into a hay mow, for removing the moisture from such material as it is delivered or after it is in place, and in general, for providing a portable utility transfer apparatus which may be generally used.

Referring now more particularly to the drawings, this conveyor is represented as mounted upon a wheeled truck 6 of the trailer type having an internal combustion engine 8 with a delivery fan or blower 10 and a suction inlet 12 for the blower.

Extending from the blower on top of the truck 6 is an air delivery pipe 14 which may be connected at its discharge end to any suitable pipe or extension 16 for delivering the material at a distance or an elevation as desired.

Mounted on the truck over a discharge pipe is a separator 18 preferably made of light metal in the form of a circular tank having a converging bottom 20 terminating in a circular casing 22 and a reduced feeding neck 24 which opens into the top of the discharge pipe 14. A top 26 covers the separator 18 and a cylindrical inlet tube 28 open at the bottom extends through the top and is connected by means of a lateral extension 30 with the suction inlet 12 for the fan. The lower end of the inlet tube 28 terminates at a point above the converging bottom 20, and a heater 32 is supported directly below the bottom of the tube 28. This heater is of a closed type having a burner 34 receiving oil through a pipe 36 extending to the outside of the separator and connected to a suitable source of supply on the truck and is contained in the separator so that no sparks can be discharged into a barn or a corn crib.

A material inlet comprises a pipe section 40 connected tangentially to the upper portion of the separator, and the outer end of the pipe may be connected to any suitable supply pipe 42. At the inside of the separator and secured to the inside thereof are a number of descending spirally arranged flights 44 for receiving incoming material from the inlet pipe section 40 and directing it spirally downward within the separator around the outside thereof and toward the inclined bottom of the separator, by centrifugal action.

With this construction, the heavier materials are thus guided and directed around the outside of the separator which frees the air for passage and removal through the inlet pipe 28 to the suction of the blower.

In the circular casing 22 is a rotatable feeder 46 mounted on a shaft 48 and having a number of radiating arms 50 each preferably provided with a sealing member 52 at its outer end, adapting the feeder to fit closely in the circular portion 22. At the outside of this circular portion and mounted upon the shaft 48 is a pulley 54 engaged by a belt 56 and driven by means of a pulley 58 operated by the engine 8.

As the material in the separator moves downwardly in the inclined bottom 20, it is discharged therefrom by the feeder 46 which acts as an air seal between the separator and the discharge pipe 14. In order to prevent the accumulation of materials from the separator upon the ends of the feeder arms or upon the sealing members 52 thereof, a fixed member or a rotor 60 is mounted at the lower edge of the inclined bottom 20 in a position to engage the ends of the feeder arms 50 or the sealing members 52 thereof, the purpose of which is to wipe hay or other material from the extremities of the arms to prevent an accumulation of hay or other material thereon. This rotor is rotated at high speed in a direction opposite to the movement of the end of the arm and it rotates so that all of the hay is brushed back into the container and into the space between the arms. In order to operate the rotor, the belt 56 (or another belt) engages a pulley 62 and is of a size to actuate the rotor at high speed. This rotor may be made of rubber, metal, or other material and preferably has a corrugated surface 64 for wiping the ends of the arms before they reach the sealing point in the cylindrical portion 22.

At the junction between the neck 24 and the discharge pipe 14 is a damper valve 66 mounted upon a pivot 68 at the top of the pipe and with an operating handle 70 by means of which it may be moved and set in any desired position. It is movable from a position across the pipe 14 upwardly to a position at the top of the pipe and may be held in adjusted position in which it is set. This valve may be varied to create a vacuum or whirling effect at the discharge point or reduced neck 24 so that light materials will be drawn into the outgoing or discharging air stream.

At the outer end of the supply pipe 42, are two spiral blades 72 each mounted upon a shaft 73 centrally located in the end of the supply pipe and extending inwardly from the end thereof, the two spiral blades being located diametrically opposite upon the shaft and extending from a point near the end of the inlet pipe where the blade has no width and gradually increasing in width inwardly of the pipe to clear and rotate freely therein, thus providing a double spiral rotary distributor which is actuated by the inrushing air.

The outer end of the shaft 73 extends just beyond the end of the pipe 42 and at this end of the shaft is a curved arm 74 extending outwardly from the shaft an amount less than the inner diameter of the inlet pipe 42, and rotatable with the shaft due to the action of the blades 72. Between the agitator arm 74 and the adjacent smaller ends of the blades 72 is a bearing 75 in which the shaft 73 is rotatable. This bearing is supported centrally at the end of the pipe 42 at one end of an arm 76, the other end of which extends substantially beyond the pipe and is connected by an angular extension 77 with an attachment portion 78 which has a slot 79 parallel with the length of the pipe 42 and a fastening bolt 80 extending through the slot into the side of the pipe.

With this construction, the bearing 75 and the shaft 73 is adjustable longitudinally of the pipe to the extent permitted by the slot 79 to vary the position of the agitator relative to the end of the pipe depending upon the materials to be picked up by the suction of the pipe. This construction also prevents the end of the pipe from being closed or shut off by placing it against a flat surface since the agitator and the supporting arm extend beyond the end of the pipe at all times.

With this construction, the suction in the pipe 42 rapidly rotates the spiral blades 72 and the shaft 73 which likewise rotates the agitator at the outside of the tube. This prevents material from clogging or balling together at the end of the pipe 42 and the spiral blades break up the material as it is drawn into the tube so that the material is fed evenly and distributed throughout the pipe.

With this construction, the material to be conveyed is drawn inwardly by suction induced by the blower 58 through the supply pipe 42 and is prevented from clogging at the opening by the spiral blades 72. The agitator 74 at the end of the supply pipe loosens the material at that point so that it may be drawn more readily into the supply pipe by the suction. The material is drawn inwardly from the supply pipe through the inlet pipe 40 into the separator 18, the heavier materials following around the wall below the spirally arranged flight 44 toward the bottom thereof and the air being directed centrally through the suction inlet pipe 28. Rotation of the feeder at the bottom of the separator causes a continuous feeding movement of the material from the separator into the discharge tube 14, and at the same time wiping the feeding arms clear to prevent the lodgement of any material thereon so that the air sealed between the bottom of the separator and the opening into the discharge pipe 14 will not be broken, and so that the material will not clog the feeder at the ends of the arms or let any air pass through.

This conveyor may be used either with or without a heater and the heater may be used to dry hay or grain in a barn or bin without using the apparatus as a conveyor. The heater is often used in conveying oats, soybeans, wheat, green hay and other materials which may be slightly damp or wet. All other methods used to dry hay in a barn or to dry corn in the crib are suitable only for drying. They are not suitable for handling material at the same time so that in this machine, the materials may be dried while they are being transported or elevated, and also dried when in the barn or crib, all by the same machine.

Although a preferred construction has been described in some detail, it should be regarded as an example or illustration and not as a restriction or limitation of the invention, as many changes in the construction, combination and arrangement of the parts may be made without departing from the spirit and scope of the invention.

What I claim is:

1. A portable pneumatic conveyor, comprising a suction blower, power means to drive the blower, an air-material separator having a tangential inlet, a suction pipe from the blower extending from the top downwardly into the separator, a heater at the bottom of the pipe in the separator, a discharge pipe from the blower, connected to the bottom of the separator, a feeder at the bottom of the separator having rotatable arms for discharging material from the separator into the discharge pipe and means to engage the ends of the arms for wiping material therefrom.

2. In a pneumatic conveyor of the class described, comprising an air-material separator having a tangential inlet, flights on the inner wall of the separator for guiding material downwardly so that centrifugal action helps separate air from material, a suction inlet extending from the top of the separator downwardly at the center toward the bottom thereof, an inclined bottom for the separator, a heater in the separator to remove moisture, a discharge blow pipe connected to the bottom of the separator through a reduced circular portion, a feeder rotatable in the circular portion having projecting arms for feeding material from the separator into the discharge pipe, and a roller mounted at the sealing side of the feeder adapted to engage the ends of the arms for wiping materials therefrom before the arms reach the said circular portion.

3. In a pneumatic conveyor, an air-material separator having a tangential inlet and an air suction pipe extending centrally from within the separator, and outwardly through the top thereof, an inclined bottom for the separator, a moisture removing heater in the separator, a blower discharge pipe connected to the bottom of the separator through a circular portion and a reduced neck, a feeder having radiating arms rotatable in the circular portion, a rotor movable in the direction opposed to the feeder for wiping materials from the outer ends of the arms before they enter the circular portion, and a damper to extend variably across the discharge pipe and upwardly across the reduced neck to change the draft in the discharge pipe so that lighter and heavier materials may be discharged from the feeder.

4. In a portable conveyor, an air-material separator having a suction inlet, means for guiding the material downwardly around the inner periphery of the separator, a suction outlet pipe extending from the top centrally downward into the separator, a feeder at the bottom of the separator comprising arms for engaging material therein, and discharging the material therefrom, a heater supported centrally in the separator below the lower end of the suction inlet and above the feeder in the bottom thereof, and a discharge blower pipe connected with the bottom of the feeder for receiving material discharged thereby from the separator.

JAMES F. FINNEGAN.

REFERENCES CITED

The following references are of record in the file of this patent:

UNITED STATES PATENTS

| Number | Name | Date |
|---|---|---|
| 555,370 | Gnadt | Feb. 25, 1896 |
| 585,804 | Weber | July 6, 1897 |
| 592,848 | Weber | Nov. 2, 1897 |
| 883,292 | Carlton | Mar. 31, 1908 |
| 1,191,001 | Hartpence | July 11, 1916 |
| 1,736,243 | Bailey | Nov. 19, 1929 |
| 1,783,487 | Weiss | Dec. 2, 1930 |
| 1,822,221 | Jones | Sept. 8, 1931 |
| 1,892,233 | Chappell | Dec. 27, 1932 |
| 2,024,469 | Mitchell | Dec. 17, 1935 |
| 2,098,024 | Bailey | Nov. 2, 1937 |
| 2,393,766 | Gordon | Jan. 29, 1946 |
| 2,435,927 | Manning et al. | Feb. 10, 1948 |

FOREIGN PATENTS

| Number | Country | Date |
|---|---|---|
| 541,734 | Great Britain | Dec. 9, 1941 |